United States Patent
van Beek et al.

(10) Patent No.: US 11,096,397 B2
(45) Date of Patent: Aug. 24, 2021

(54) METHOD FOR HIGHLY CONCENTRATING AQUEOUS SOLUTIONS

(71) Applicant: GEA Niro PT B.V., s-Hertogenbosch EE (NL)

(72) Inventors: Timo van Beek, Utrecht (NL); Jan A. M. V. van Esch, Eindhoven (NL); Reinhard Scholz, Kerken (DE)

(73) Assignee: GEA Niro PT B.V., 's-Hertogenbosch (NL)

( * ) Notice: Subject to any disclaimer, the term of this patent is extended or adjusted under 35 U.S.C. 154(b) by 431 days.

(21) Appl. No.: 15/670,574

(22) Filed: Aug. 7, 2017

(65) Prior Publication Data

US 2018/0042254 A1 Feb. 15, 2018

(30) Foreign Application Priority Data

Aug. 11, 2016 (DE) .......................... 102016114947.0

(51) Int. Cl.
| | | |
|---|---|---|
| *A23C 9/142* | (2006.01) | |
| *B01D 61/02* | (2006.01) | |
| *A23C 1/06* | (2006.01) | |
| *B01D 9/04* | (2006.01) | |
| *B01D 61/14* | (2006.01) | |

(52) U.S. Cl.
CPC .............. *A23C 9/1422* (2013.01); *A23C 1/06* (2013.01); *A23C 9/1425* (2013.01); *A23C 9/1427* (2013.01); *B01D 9/04* (2013.01); *B01D 61/025* (2013.01); *B01D 61/027* (2013.01); *B01D 61/145* (2013.01); *A23C 2210/202* (2013.01); *B01D 2311/08* (2013.01); *B01D 2311/25* (2013.01); *B01D 2311/26* (2013.01); *B01D 2315/16* (2013.01)

(58) Field of Classification Search
CPC ....... A23C 9/1422; A23C 1/06; A23C 9/1425; A23C 9/1427; A23C 2210/202; B01D 9/04; B01D 61/025; B01D 61/027; B01D 61/145; B01D 2311/08; B01D 2311/25; B01D 2311/26; B01D 2315/16
USPC ....... 426/533, 534, 656, 657, 650, 565, 524, 426/580
See application file for complete search history.

(56) References Cited

U.S. PATENT DOCUMENTS

| | | |
|---|---|---|
| 3,283,522 A | 11/1966 | Ganiaris |
| 3,872,009 A | 3/1975 | Thijssen |
| 4,491,600 A | 1/1985 | Göbel et al. |
| 4,592,768 A | 6/1986 | Cutler et al. |
| 2012/0164277 A1 | 6/2012 | Robinson et al. |

FOREIGN PATENT DOCUMENTS

| | | |
|---|---|---|
| CN | 103074404 A | 5/2013 |
| DE | 1519716 A1 | 2/1970 |
| DE | 2517928 A1 | 11/1976 |
| DE | 2949215 C2 | 12/1988 |
| DE | 102014101843 A1 | 8/2015 |
| DE | 102014104686 B3 | 9/2015 |
| DE | 102014104689 B3 | 9/2015 |
| DE | 102014107573 B3 | 10/2015 |
| EP | 0051340 B1 | 9/1984 |
| EP | 3040108 A1 | 7/2016 |
| FR | 2210427 A1 | 7/1974 |
| WO | 0100534 A1 | 1/2001 |

OTHER PUBLICATIONS

"Freeze Concentration of Fruit Juices", Critical Reviews in Food Science and Nutrition, vol. 20, Issue 3, by S. S. Deshpande, Shridhar K. Sathe and D. K. Salunkhe, published Feb. 1984.
"Freeze Concentration of Dairy Products Phase 2", Electric Power Research Institute, excerpted, prepared by Dairy Research Foundation, published Oct. 1995.
Encyclopedia entitled, "Foods and Food Production Encyclopedia", p. 721, by Douglas M. Considine and Glenn D. Considine, published 1982.
"Membrane-Freeze Concentration Hybrid for Temperature-Sensitive Biomolecules", Chemical Engineering Technology, by Timo van Beek, Michael Budde and Jan van Esch, published Sep. 2018.

Primary Examiner — Leslie A Wong
(74) Attorney, Agent, or Firm — Gardner, Linn, Burkhart & Ondersma LLP (57) ABSTRACT

A method for highly concentrating aqueous solutions containing thermally sensitive organic constituents and with or without mineral constituents, wherein firstly, a major portion of the water is extracted by membrane filtration from the solution for pre-concentration and is discharged from the process and the solution which is pre-concentrated is then subjected to a freeze concentration procedure, in which, in the form of separated ice crystallisate, further water is extracted from the solution. To promote results, that concentration may be effected in the freeze concentration procedure until a viscosity of the mother solution of at least 0.0002 m²/s is achieved, and in that the separated ice crystallisate from the freeze concentration with the mother solution adhering thereto as a suspension is returned to the membrane filtration upstream of the membrane filtration or after melting of the ice crystallisate.

18 Claims, 4 Drawing Sheets

METHOD FOR HIGHLY CONCENTRATING AQUEOUS SOLUTIONS

CROSS REFERENCE TO RELATED APPLICATION

The present application claims priority of German patent application Ser. No. DE102016114947.0, filed on Aug. 11, 2016.

BACKGROUND AND FIELD OF THE INVENTION

The invention relates to a method for highly concentrating aqueous solutions containing thermally sensitive organic constituents.

A very simple method of recovering constituents dissolved in water consists of evaporating the solution. Owing to the temperature-sensitivity in particular of organic constituents, such as e.g. proteins, flavouring substances or enzymes, this option is disregarded in many cases from the outset. An alternative method for concentrating aqueous solutions which has been used for many years is freeze concentration which in terms of plant-engineering is considerably more complex than evaporation.

FR 2210427 A1 discloses a method for freeze concentration of protein-containing aqueous solutions, in which the feed material is initially subjected to a freeze treatment, wherein a suspension of ice crystals is obtained in a concentrated solution. This suspension is divided in a subsequent separating stage into a first stream of the concentrated solution, which constitutes the product, and into a second stream of ice crystals and adherent mother solution. The ice crystals of the second stream are melted and the resulting fluid is subjected to ultra-filtration, by means of which, on the one hand, pure water is obtained which is discharged from the process, and, on the other hand, a second stream of concentrate is produced which is returned to the freeze concentration stage.

WO 0100534 A1 discloses a method of waste water purification, in which the waste water stream is fed to a freezing device for producing a suspension of ice crystals and a more highly concentrated solution. The crystallisate is separated in a subsequent separating stage. The obtained mother solution including the noxious substances concentrated therein is definitively disposed of after a procedure of separation of salts is performed where appropriate e.g. by means of combustion. The water of the ice crystallisate together with the still included noxious substance portions is fed into a device for reverse osmosis, in which pure water is separated as a permeate and is discharged from the process, while the retentate together with the noxious substances is returned to the freezing device.

A method for obtaining desalinated water from seawater is described in U.S. Pat. No. 4,592,768. The seawater is fed to a freezing device, in which a continuously drawn-off stream of ice crystals and mother solution is produced. The ice crystal stream is fed to a centrifuge where it is separated into an almost 100% water-containing ice crystal stream and a stream of mother solution. A portion of the mother solution is then returned to the freezing device, whereas the rest is immediately discharged from the process. The ice crystal stream drawn off from the centrifuge is melted in order to obtain the desired water product and, e.g. after an ion-exchange treatment to remove disruptive elements, such as Cl, Fe and Ca, is subjected to a reverse osmosis treatment for further purification. The remaining mother solution from the reverse osmosis can then be returned completely or partially to the freezing device or can be ejected.

CN 103074404 A discloses a method, in which an aqueous solution of hydrolysed whey protein is subjected initially to pre-concentration by means of ultra-filtration and reverse osmosis before the protein powder is obtained by freeze-drying.

EP 3040108 A1 describes the production of concentrated liquids, such as milk or whey, with the aid of a membrane concentration method and a freeze concentration method. Membrane concentration can be performed as ultra-filtration, reverse osmosis or nano-filtration. Then, in order to achieve further concentration a freeze concentration procedure is performed, after which the ice crystallisate thus formed is separated from the concentrated liquid e.g. in a centrifuge and is discharged.

Furthermore, DE 2949215 C3 describes a method for concentrating aqueous solutions containing temperature-sensitive constituents, such as for instance flavours or vitamins. Firstly, pre-concentration is effected by means of ultra-filtration followed by freeze concentration. The ice crystallisate formed is separated mechanically by means of centrifugation, screening or using a washing column. The initial ultra-filtration increases the efficiency with regard to the final concentration and allows undesired substances to be separated from the solution which is to be concentrated. A plurality of separating stages can be used for the purpose of pre-concentration. The ice crystallisate separated in the washing column contains only extremely small quantities of adherent or dissolved constituents. In order to achieve further concentration, the concentrate obtained can be returned once again to the crystallisation cycle where required. According to example 1 described, a viscosity of 50 mm$^2$/s is achieved.

US 2012/0164277 A1 which forms the generic type describes, for the production of a milk beverage having improved taste properties, a method for concentrating an aqueous milk component. Firstly, the feed material is subjected to reverse osmosis and/or ultra-filtration. The material which is pre-concentrated in this way is then further highly concentrated by means of freeze concentration and is then e.g. freeze-dried, spray-dried or vacuum-dried. There are no more detailed statements relating to what occurs in detail with the water proportions which are removed from the feed material.

Methods for concentrating aqueous solutions containing organic constituents are known from operational practice and, as in US 20120164277 A1, provide a combination of membrane filtration with subsequent freeze concentration, wherein the clear water separated in the membrane filtration and in the freeze concentration procedures is discharged directly from the process in each case. In the case of multiple-stage freeze concentration, it is typical to return the water of one stage, which is separated in the form of an ice crystal suspension, in each case to the directly preceding stage of freeze concentration. The separated clear water is discharged from the process at regular intervals in the input stage of the freeze concentration procedure. Owing to the significant increase in viscosity as the concentration increases, the freeze concentration procedure has hitherto scarcely been used for the purpose of highly concentrating aqueous solutions containing organic solids. In the case of the known methods of freeze concentration, the concentration of organic solids (detectable from the level of viscosity) which can be achieved by means of high concentration is, depending upon the separating member, between 0.000015 m$^2$/s (15 cSt) (hydraulic washing column) and less than 0.00006 m²/s (60 cSt) (piston-operated washing column). This limitation occurs inter alia by virtue of the fact that the viscosity which increases significantly at higher concentrations leads to a reduction in crystal size; smaller crystals and the high viscosity of the mother liquor hamper the separation of solids and the washing process in the filter cake. From the point of a specific concentration/viscosity, it is then no longer possible for any pure water to be withdrawn. This is the limitation of the operating range for the high concentration procedure in the conventional freeze concentration process. However, lower water extraction in the high concentration procedure signifies corresponding additional work in the subsequent drying of the organic solid which is generally desired as the product. Since the drying procedure also uses processes which are intended to avoid thermal loading of the product as far as possible, e.g. freeze-drying, this routinely leads to very high production costs. Even when a considerably more cost-effective spray-drying procedure is used, it is important to have a solids concentration which is as high as possible in order to keep the thermal loading of the organic constituents adequately low.

SUMMARY OF THE INVENTION

The present invention provides a method for highly concentrating aqueous solutions containing temperature-sensitive organic solids, which method is intended, with the lowest possible level of plant and operational outlay, to provide the purest possible, qualitatively high-grade concentrate of the organic constituents and to ensure the highest possible yield. An installation for carrying out this method shall also be proposed.

In accordance with an embodiment of the invention, a method is provided for highly concentrating aqueous solutions containing thermally sensitive organic constituents and with or without mineral constituents; firstly, a major portion of the water is extracted by means of membrane filtration from the solution for pre-concentration and is discharged from the process. The solution which is pre-concentrated in this way is then subjected to a freeze concentration procedure, in which, in the form of separated ice crystallisate, further water is extracted from the solution. In the case of such a method, the stated object is achieved in accordance with the invention by virtue of the fact that concentration is effected in the freeze concentration procedure significantly beyond the currently typical maximum operating point until a viscosity of the mother solution of at least 0.0002 m²/s (200 cSt) is achieved and the separated ice crystallisate from the freeze concentration with the adherent mother solution as a suspension is returned to the membrane filtration upstream of membrane filtration or after melting of the ice crystallisate.

In accordance with a further embodiment of the invention, an installation for carrying highly concentrating aqueous solutions is provided. The installation includes a device for membrane filtration which has a drain line for waste water, and a device for freeze concentration which is connected on the input-side to the device for membrane filtration and which for its part has a draw-off point for concentrated mother solution and a draw-off point for ice crystal suspension, where the line for drawing off the ice crystal suspension returns upstream of or to the membrane filtration.

The present invention provides a method and installation for highly concentrating aqueous solutions containing thermally sensitive organic constituents, and in particular provides the purest possible, qualitatively high-grade concentrate of the organic constituents with the highest possible yield with the lowest possible level of plant and operational outlay, as is explained in more detail with the aid of the method diagrams illustrated in the figures.

DESCRIPTION OF THE PREFERRED EMBODIMENTS

Figure 1:
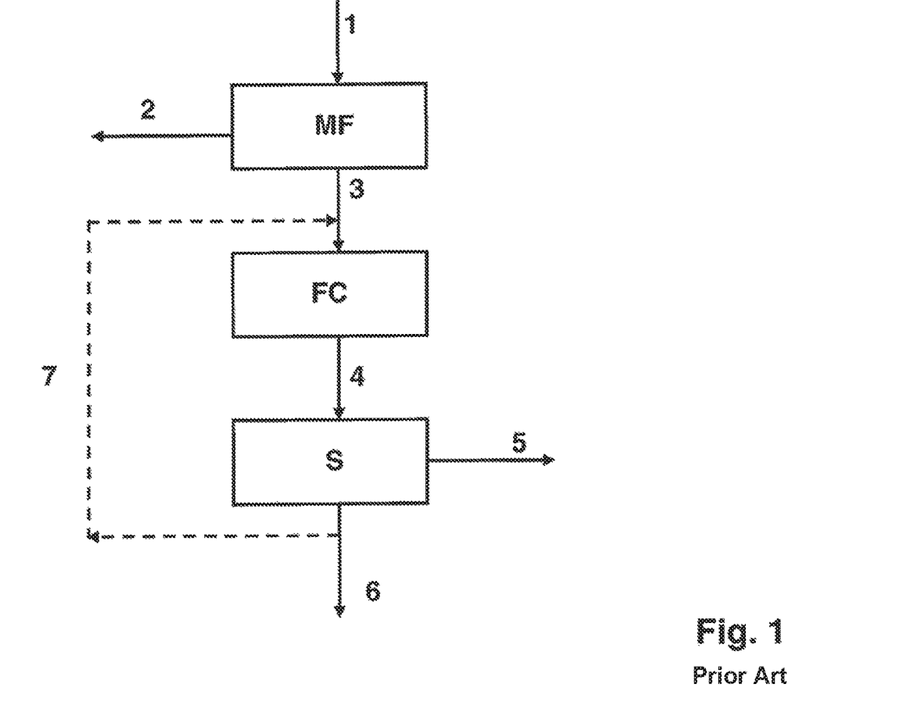
FIG. 1 shows a known concentration method.
Figure 5:
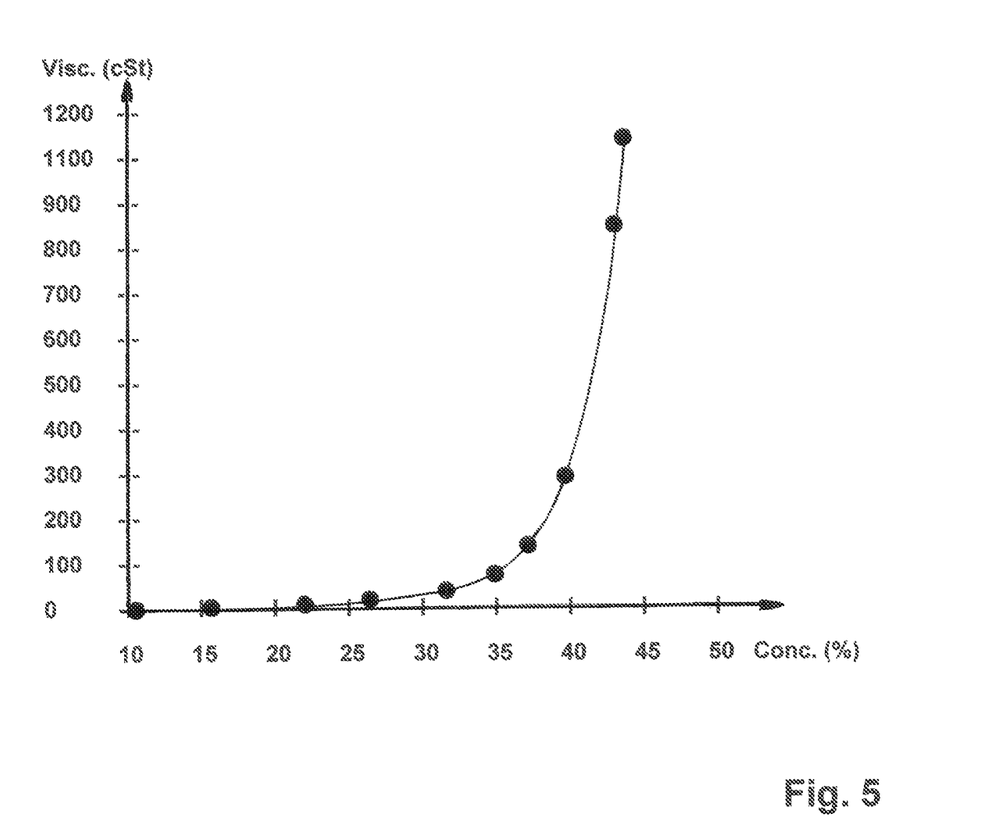
FIG. 5 shows a diagram of viscosity as a function of concentration.

The method for concentrating solutions containing organic constituents, as illustrated in FIG. 1, corresponds to the method known from US 2012/0164277 A1. Firstly, in order to extract the vast majority of the water, the solution 1 to be concentrated is subjected to membrane filtration MF which can be performed as ultra-filtration, nano-filtration or even as reverse osmosis. The water thus separated containing the portion of the mineral solids contained therein is discharged as waste water 2. The organic constituents are retained by means of the membrane filtration and are fed, together with the non-separated portion of the original solution, as a now pre-concentrated solution 3 to a freeze concentration stage FC. During the freeze concentration stage FC, a suspension 4 is formed consisting of ice crystallisate and the mother solution which now has a correspondingly higher concentration of organic constituents. In a subsequent solid/liquid separation stage S, the mother solution is extensively separated from the ice crystallisate and is obtained as a highly concentrated mother solution 6. A portion of this mother solution can be returned to the freeze concentration stage FC (partial stream 7) and therefore can cycle repeatedly through the freeze concentration stage in order to increase the dwell time and increase the degree of concentration. Owing to the already aforementioned problems caused by the viscosity of the mother solution, which increases disproportionately highly as the concentration increases, and caused by the simultaneous tendency of a smaller-sized ice crystallisate to form, this crystallisate can only be separated from the mother solution with ever increasing difficulty and ever decreasing precision (i.e. loss of organic substance in the waste water). FIG. 5 shows using the example of a phytase solution how drastically the viscosity increases as the concentration of the organic solids increases. Therefore, the operating point of current freeze concentration installations is selected such that the concentration in the mother solution leads mostly to a maximum viscosity of 0.000015-0.00002 m²/s (15-20 cSt) but in each case considerably less than 0.00006 m²/s (60 cSt). Therefore, the achievable concentration by means of freeze concentration is restricted to a maximum order of magnitude of 30-35%, unless higher losses of organic substance are tolerated. The dry organic substance (e.g. enzymes or proteins) which is ultimately desired in many cases can be obtained from the concentrated mother solution 6 by means of a subsequent drying procedure (e.g. spray-drying or freeze-drying).

Therefore, it is a significant disadvantage of this known method that a considerable proportion of water remains in the mother solution and therefore the required drying work to achieve a dry organic solid remains considerable. This applies particularly if freeze-drying is required owing to a pronounced temperature-sensitivity of the organic constituents. A further disadvantage of this known method is that as the ice crystallisate is discharged a portion of the organic constituents is also lost, and even more so the higher the viscosity.

Figure 2:
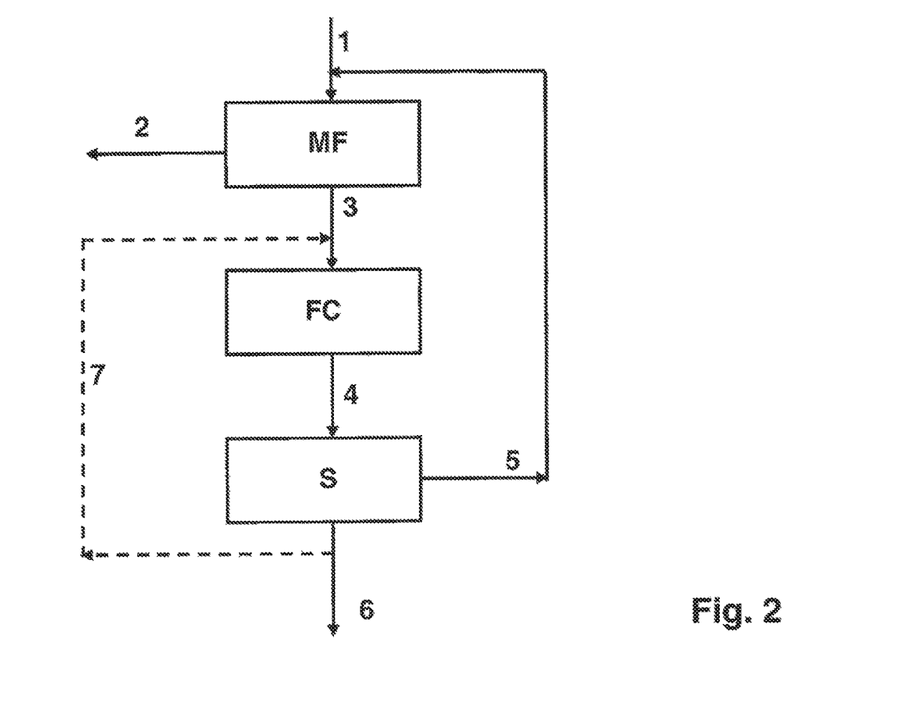
FIG. 2 shows a concentration method in accordance with the invention.

With regard to the concentration of the organic constituents and thus the viscosity of the mother solution, the present invention moves into an area previously considered to be completely unrealistic by experts. On the one hand, provision is made in the invention specifically that the freeze concentration procedure is performed in a targeted manner to such an extent that the viscosity of the mother solution is at least 0.0002 $m^2/s$ (200 cSt), preferably at least 0.00025 $m^2/s$ (250 cSt) or at least 0.0003 $m^2/s$ (300 cSt), particularly preferably at least 0.0005 $m^2/s$ (500 cSt) or at least 0.0008 $m^2/s$ (800 cSt), in particular at least 0.001 $m^2/s$ (1000 cSt). As a result, a considerable reduction in the water proportion is achieved in the highly concentrated solution produced. On the other hand, provision is made in the invention, as shown in FIG. 2 using the same reference numerals as in FIG. 1, that the ice crystallisate 5, which is separated from the freeze concentration stage FC by the solid/liquid separation S, together with the adherent mother solution is returned upstream of or, if the ice crystallisate is melted beforehand, to the preferably multiple-stage membrane filtration MF. In this manner, not only is no organic substance whatsoever lost in the process, but a further advantage is achieved in that the solution freshly fed into the process is cooled by the cold, melting ice crystallisate. This is desirable because the temperature of the solution should remain at a low level (possibly below 35° C., preferably below 10° C.) but also heat is unavoidably introduced into the solution by reason of the pumping output required to perform membrane filtration. During multiple-stage membrane filtration, after the ice crystallisate has melted it is preferably injected into a filtration stage, in which the concentration of the ice melt corresponds to that of the solution in this stage. Melting can be performed in a heat exchanger, through which the fed solution or a part thereof flows. Therefore, the cooling output used to produce the ice crystallisate can also be used directly by this recirculation in the process, i.e. it is not lost as in FIG. 1.

Within the scope of the present invention, it was surprisingly possible to demonstrate that in spite of the considerable increase in the viscosity of the mother solution, the pumping capability thereof is maintained in the tested range. Moreover, the circumstance of poorer separability of the ice crystallisate from the mother solution, i.e. the significantly deteriorated separation effect does not ultimately produce any disadvantage with regard to the output of the organic substance because the ice crystallisate is returned from the freeze concentration stage with the adherent mother solution, and only the waste water from the membrane filtration stage leaves the process, i.e. as waste water which is practically completely free of organic substance. In addition, it has been found that the reduction—which increases significantly per se with the viscosity—in the particle size of the ice crystallisate in the more highly concentrated mother solution can be influenced effectively by a longer dwell time of the solution in the freeze concentration stage FC. It has been demonstrated that the dwell time should be at least 45 min, preferably at least 1 h, in particular at least 2 h. In this way, a sufficient amount of coarse crystallisate can be formed from the originally produced small-sized ice crystallisate and can still be separated from the highly viscous mother solution.

It is typical for the method in accordance with the invention that the water to be extracted from the solution for high concentration purposes is withdrawn solely by the membrane filtration stage MF, i.e. by a method stage which can be reliably controlled and can be operated in a particularly favourable manner with respect to energy and cost. It is thus possible to reliably prevent the thermally sensitive organic constituents of the solution from being damaged. Typically, the concentration of the organic solids in the solution prior to the freeze concentration stage is already increased to an order of magnitude of about 20-25 wt. % by virtue of the water extraction in the membrane filtration stage.

In the case of solutions, from which enzymes or proteins are to be obtained (e.g. whey), ultra-filtration or nano-filtration are particularly suitable in accordance with the invention for membrane filtration MF. In the case of solutions consisting of skimmed milk (low-fat milk), reverse osmosis is advantageously also used for filtration purposes.

Figure 3:
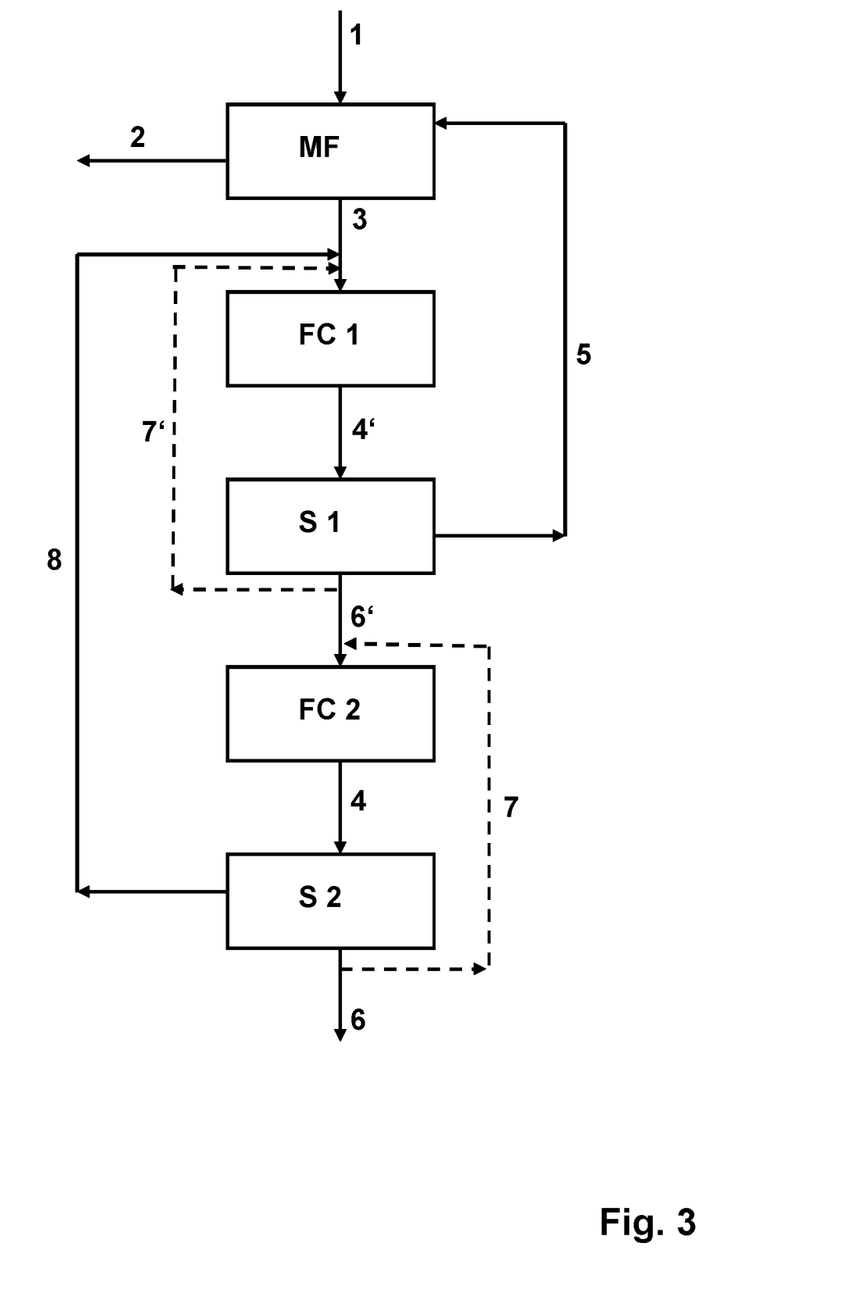
FIG. 3 shows a concentration method in accordance with the invention including two-stage freeze concentration.

In order to achieve particularly high degrees of concentration, it can be expedient to perform the freeze concentration procedure in the form of multiple-stage, in particular two-stage, freeze concentration, as shown in FIG. 3. The pre-concentrated solution 3 coming from the membrane filtration stage passes to the first stage of freeze concentration FC1 and forms a suspension 4' consisting of ice crystallisate and mother solution. The concentration of this mother solution has increased further with respect to the value after the membrane filtration stage MF but has not yet achieved the desired value. Therefore, a merely partially concentrated mother solution 6' is drawn off from the solid/liquid separation stage S1 following the first stage and is fed into the second stage of freeze concentration FC2. The ice crystallisate separated in the second solid/liquid separation stage S2 with adherent mother solution 5 is returned to or upstream of the membrane filtration stage MF in a corresponding manner as in FIG. 2. Likewise, FIG. 3 illustrates the possible recirculation 7' of a portion of the mother solution separated in S1 (illustrated by the arrow in dashed lines). The ice crystal suspension 4 produced in the second stage of freeze concentration FC2 is fed into the second solid/liquid separation S2 where it is divided into a stream of the—as desired—highly concentrated mother solution 6 and a stream of the ice crystal suspension 8. Owing to the correspondingly high viscosity and poorer separability of the mother solution from the ice crystallisate, the suspension 8 still contains a considerable portion of the mother solution. However, owing to the recirculation into the first stage of freeze concentration FC1, the organic substance contained therein is not lost.

When more than two stages are used, the ice crystallisate produced is returned from a higher stage in each case to the directly preceding stage of freeze concentration. Only the separated ice crystallisate from the first stage FC1 always passes directly back to the membrane filtration stage MF.

In order to separate the ice crystallisate in the freeze concentration procedure, essentially a large number of methods and apparatuses for solid/liquid separation are suitable (e.g. centrifuges or apparatuses having a press piston). They can be operated continuously or discontinuously and with a (strong or weak) washing effect or even no washing effect.

In order to separate the ice crystallisate in a multiple-stage freeze concentration procedure, in particular for the first stage S1, a continuously operating hydraulic washing column is advantageously used, as known for instance from DE 10 2014 107573 B3 by the applicant. Depending upon the level of the operating pressure, a more or less pronounced washing effect can be produced. A higher operating pressure tends to reduce the washing effect. Essentially, the higher the viscosity of the mother solution, the lower the washing effect. In the case of a highly viscous mother solution, only thickening, and not actual washing, takes place. The compression of the ice crystal bed in such a washing column is typically above 45% and can be up to 65% at adequate operating pressure.

In an advantageous manner, instead of using a washing column, it is also possible to use for separation purposes a continuously operable hydraulic thickener, as known from DE 10 2014 104686 B3 by the applicant, in a multiple-stage freeze concentration procedure, in particular for the first stage of freeze concentration.

The separation effect both of the hydraulic washing column and of the hydraulic thickener decreases as the viscosity of the mother solution increases. Therefore, at a viscosity of the mother solution from about 0.00025 $m^2/s$ (250 cSt), apparatuses which operate discontinuously are expediently also used for separation purposes. This can also be e.g. a centrifuge. The use of a piston-operated washing column, as known for instance from the documents U.S. Pat. No. 3,872,009 or EP 0051340 B1, is particularly advantageous. Such washing columns can be used with small dimensions up to a viscosity of 0.0005 $m^2/s$ (500 cSt). The compression of the ice crystal bed in a piston-operated washing column is above 60% at viscosities of 0.00006 $m^2/s$ (60 cSt) and can be up to 80% depending upon the ice crystal size, but reduces considerably at high viscosities. At viscosities of 0.001 $m^2/s$ (1000 cSt) or higher, the separation of the mother solution was achieved only with the aid of a filter which is subjected to incident flow and is continuously scraped. Since for this operational scenario a relatively large amount of mother solution would then be fed with the crystals into the membrane stage (which as a consequence would lead to very high internal cycle flows) the use of multiple-stage methods, as described hereinafter, is particularly recommendable in this case.

Within the scope of the present invention, in order to form the ice crystallisate essentially any designs of apparatuses for freeze concentration can be used. In the case of solutions used having a comparatively lower viscosity (i.e. below 0.00003 $m^2/s$ (30 cSt)) in the respective stage of freeze concentration, it is recommended to use a drum crystallizer, i.e. in particular for the first stage CF1, owing to the simpler and more cost-effective design.

By reason of the significantly increasing viscosity at higher concentrations of the organic constituents, it is recommended in many cases in multiple-stage freeze concentration to use an installation having a hybrid design, as known from DE 10 2014 104689 B3 by the applicant. In the case of hybrid design, the first stage is designed as a drum crystallizer, whereas the last and therefore coldest stage has, on the one hand, a motor-agitated crystallisation container, from which the highly concentrated solution can be drawn off via a screen or filter, and has, on the other hand, a freezing device which is connected to the crystallisation container but is designed to be separate therefrom in terms of housing technology. In the case of more than two stages, the intermediate stages can be designed either as drum crystallizers or in accordance with the last stage. The advantage of the design of the last stage is the better suitability for a high viscosity of the mother solution which is governed by the high degree of concentration and the low temperature. Furthermore, it also ensures improved size-growth of the ice crystallisate by reason of the separation of nucleation and crystal growth which take place in different apparatuses. The separating device provided for separating the highly concentrated mother liquor is merely a screen or filter which is subjected to incident flow preferably using a separate pumping unit and which covers the inlet of the discharge point for the mother liquor and thus retains the crystallisate in the crystallisation container of the freeze concentration stage. The ice crystallisate is returned as a suspension, i.e. with a comparatively high proportion of mother liquor, to the preceding stage of freeze concentration via a separate discharge point. The separation of ice crystallisate and highly concentrated mother liquor which is in this respect imprecise is not apparent in any negative manner in relation to the product yield because the system used in the method in accordance with the invention ensures that practically no organic substance is lost.

In order to avoid disruptions in operation caused by clogging of the passage openings of the screen or filter in the crystallisation container, it is recommended to clean the surface of the screen or filter appropriately by wiping or scraping during operation of the installation. This is preferably performed continuously.

Figure 4:
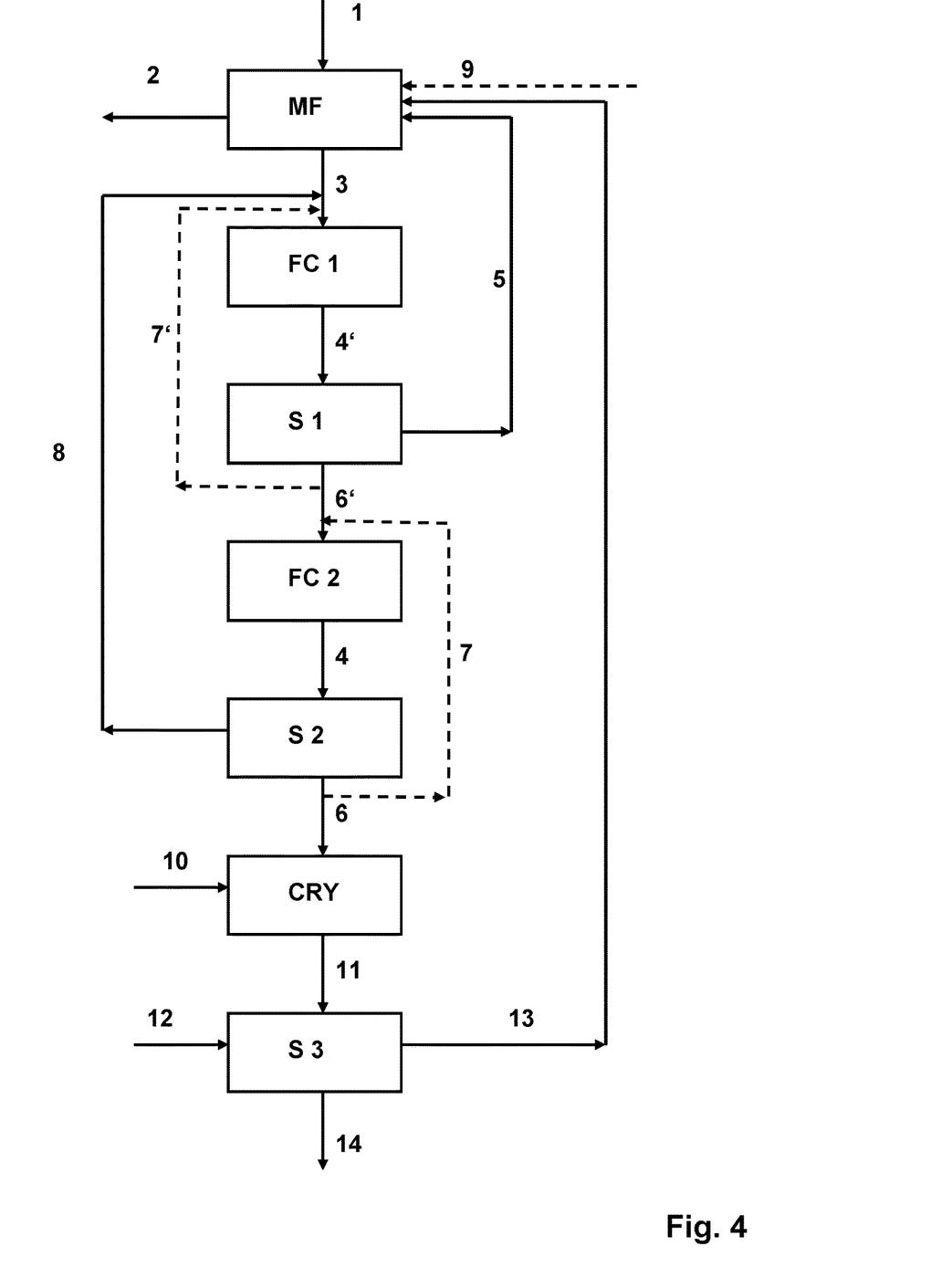
FIG. 4 shows a concentration method in accordance with the invention including product crystallisation.

FIG. 4, which is substantially identical to FIG. 2 in terms of configuration and reference numerals and in this respect does not have to be explained in greater detail, shows a further advantageous embodiment of the method in accordance with the invention. In this case, for the purpose of further treatment the already highly concentrated mother solution 6 is also subjected to a crystallisation procedure CRY, in which product crystallisate is formed rather than e.g. further ice crystallisate. This is effected in terms of a salting-out stage by the addition of corresponding agents 10, such as e.g. NaCl or alcohol, thus promoting the crystallisation of the organic constituents in the mother solution. The thus formed suspension 11 of product crystallisate and mother solution is continuously drawn off and fed to a further stage of solid/liquid separation S3. In the stage S3 which is operated using supplied washing water 12 as crystal wash, a merely still moist product crystallisate 14 of the organic constituents is separated from the mother liquor. The pure product crystallisate contains at best only traces of impurities. In accordance with the invention, the washing water is returned with the displaced mother solution upstream of or to the membrane filtration stage MF. At this location, the washing water can then be discharged from the process in the waste water 2 with little effort. In the same way, the mass flow of entrained agents 10 for product crystallisation are then also discharged from the process as if they are salts. However, when e.g. alcohol is used, the stream 13 would have to be e.g. stripped (not illustrated) in order to remove said alcohol.

Since in the case of product crystallisation, the salt mass flow in the membrane filtration stage can be very high, it is recommended to perform the multiple-stage membrane filtration MF in at least one stage with the addition of further washing water 14 (arrow in dashed lines) in the form of diafiltration. The washing water causes dilution of the salt concentration. In general, a single stage is sufficient for diafiltration, in order then to reduce the salt content to a normal level again.

The effectiveness of the method in accordance with the invention can be demonstrated by way of example with the aid of the illustration in FIG. 5. If it is assumed that, in a conventional method as shown in FIG. 1, a concentration of about 35% is achieved at best, a concentration up to about 42.5% can be achieved by the invention e.g. at an achieved viscosity of about 0.0009 m²/s (900 cSt) in the mother solution. If it is also assumed that the membrane filtration achieves a concentration up to e.g. 25%, then this means that in accordance with the invention an absolute quantity of water which is about 44% higher than the conventional method is extracted in the freeze concentration stage.

An installation for carrying out the method in accordance with the invention has, as shown in FIGS. 1 to 4, a device for membrane filtration MF which is provided with a drain line for waste water 2. Moreover, it is equipped with a device for freeze concentration FC, FC1, FC2 which is connected on the input-side to the membrane filtration stage MF and has a draw-off line for concentrated mother solution 6 and has a draw-off line for ice crystal suspension 5. In accordance with the invention, provision is made that the draw-off line for the ice crystal suspension 5 returns upstream of or to the device for membrane filtration MF. Therefore, all of the waste water can be discharged outwards via the membrane filtration MF.

In an expedient manner, the draw-off point for the concentrated mother solution 6 is equipped with a screen or filter for retaining ice crystallisate. In order to prevent it from becoming clogged as a result of possible freezing during operation, it is recommended to provide the screen or filter with a device for motor-driven wiping or scraping of its surface. Furthermore, it is advantageous to equip the draw-off point for the concentrated mother solution 6 with a separate pump device. The pump device can be installed into a circulation line which allows the suspension to flow repeatedly past the surface of the screen or filter.

The present invention permits a high concentration of corresponding aqueous solutions which is completely loss-free in relation to the yield of organic solids. The thermally sensitive organic solids contained therein are treated in an extremely gentle manner. Even enzymes retain all of their activity, as was able to be shown in tests. In particular, the method variant of the example shown in FIG. 4 including crystallisation and washing of the product crystallisate renders it possible to obtain a particularly high-grade end product. The method in accordance with the invention is particularly suitable for processing solutions, the viscosity of which tends to increase significantly. In particular, the solutions can be solutions from milk or cheese processing, whey or fractions thereof (e.g. lactoferrin) or separately produced enzyme solutions (e.g. phytase), solutions from sugar production or sugar processing, but also coffee or tea. This is merely an exemplified list.

Changes and modifications in the specifically described embodiments can be carried our without departing from the principles of the present invention which is intended to be limited only by the scope of the appended claims, as interpreted according to the principles of patent law including the doctrine of equivalents.

LIST OF REFERENCE NUMERALS 1 solution to be concentrated
2 waste water
3 pre-concentrated solution
4 ice crystal suspension
4' ice crystal suspension
5 ice crystallisate with adherent mother solution
6 concentrated mother solution
6' partially concentrated mother solution
7 recirculated concentrated mother solution
7' recirculated concentrated mother solution
8 ice crystal suspension
9 washing water
10 agents to promote product crystallisation
11 suspension of product crystallisate
12 washing water
13 solution of product crystallisate wash
14 product crystallisate
MF membrane filtration
FC freeze concentration
FC1 freeze concentration
FC2 freeze concentration
S solid/liquid separation
S1 solid/liquid separation
S2 solid/liquid separation
S3 solid/liquid separation
CRY crystallisation The embodiments of the invention in which an exclusive property or privilege is claimed are defined as follows:

1. A method for highly concentrating an aqueous solution containing thermally sensitive organic proteins, flavorings, enzymes and/or vitamins and with or without minerals, the method comprising:
   first extracting a major portion of water from the solution by means of membrane filtration to obtain a pre-concentrated solution and discharging the extracted major portion of water;
   subjecting the pre-concentrated solution to a freeze concentration procedure, in which, in the form of separated ice crystallisate, further water is extracted from the solution, wherein that concentration is effected in the freeze concentration procedure until a viscosity of a mother solution of at least 0.0002 m²/s is achieved; and
   returning the separated ice crystallisate from the freeze concentration procedure with the mother solution adhering thereto as a suspension to the membrane filtration upstream of the membrane filtration or after melting of the ice crystallisate.

2. The method as claimed in claim 1, wherein the concentration is effected in the freeze concentration procedure until a viscosity of the mother solution is at least 0.00025 m²/s.

3. The method as claimed in claim 1, wherein the freeze concentration procedure is performed in at least two freeze concentration stages, wherein only an ice crystal suspension from a first freeze concentration stage, which is immediately downstream of the membrane filtration stage, is returned to or upstream of the membrane filtration, and the ice crystallisate formed in one or more downstream freeze concentration stages is returned to the freeze concentration stage located immediately upstream.

4. The method as claimed in claim 1, wherein the membrane filtration is performed as ultra-filtration or nano-filtration.

5. The method as claimed in claim 1, wherein the membrane filtration is performed as reverse osmosis.

6. The method as claimed in claim 1, wherein the membrane filtration is performed in multiple stages.

7. The method as claimed in claim 1, wherein the ice crystallisate is separated during the freeze concentration procedure in a continuous manner by a hydraulic washing column.

8. The method as claimed in claim 1, wherein the ice crystallisate is separated in the freeze concentration procedure in a continuous manner by a hydraulic thickener.

9. The method as claimed in claim 1, wherein the freeze concentration procedure comprises a multi-stage freeze concentration procedure and wherein the ice crystallisate is separated in a last stage of the multiple-stage freeze concentration procedure in a discontinuous manner by a piston-operated washing column or by a centrifuge.

10. The method as claimed in claim 1, wherein the freeze concentration procedure is performed at least partially in a drum crystallizer.

11. The method as claimed in claim 1, wherein the freeze concentration procedure is performed in a multiple-stage installation having a hybrid design.

12. The method as claimed in claim 1, further comprising drawing off the mother solution from the freeze concentration via a screen or filter.

13. The method as claimed in claim 12, wherein a surface of the screen or filter is wiped or scraped to avoid clogging caused by freezing during operation.

14. The method as claimed in claim 12, wherein the mother solution is drawn off using a separate pumping unit.

15. The method as claimed in claim 1, further comprising, following on from the freeze concentration after separation of the ice crystallisate, directing the mother solution to a crystallisation stage, in which the mother solution has substances added thereto which bring about a reduction in the solubility of the organic constituents and the crystallisation thereof, and in that the crystallisate of the organic constituents is separated from the mother solution as product and the separated mother solution is returned to or upstream of the membrane filtration.

16. The method as claimed in claim 6, wherein the membrane filtration is performed at least in one stage as diafiltration.

17. The method as claimed in claim 1, wherein a dwell time of the mother solution in the freeze concentration stage is set to at least 45 min.

18. A method for highly concentrating an aqueous solution containing organic proteins, flavorings, enzymes and/or vitamins and with or without minerals, the method comprising:

first extracting a major portion of water from the solution by means of membrane filtration to obtain a pre-concentrated solution and discharging the extracted major portion of water;

subjecting the pre-concentrated solution to a freeze concentration procedure, in which, in the form of separated ice crystallisate, further water is extracted from the solution, wherein that concentration is effected in the freeze concentration procedure until a viscosity of a mother solution of at least 0.0002 $m^2$/s is achieved; and returning the separated ice crystallisate from the freeze concentration procedure with the mother solution adhering thereto as a suspension to the membrane filtration upstream of the membrane filtration or after melting of the ice crystallisate.

* * * * *